March 12, 1963
P. F. DANEL
3,080,879
HYDRAULIC FLOW CONTROL APPARATUS
Filed Jan. 19, 1959
2 Sheets-Sheet 1
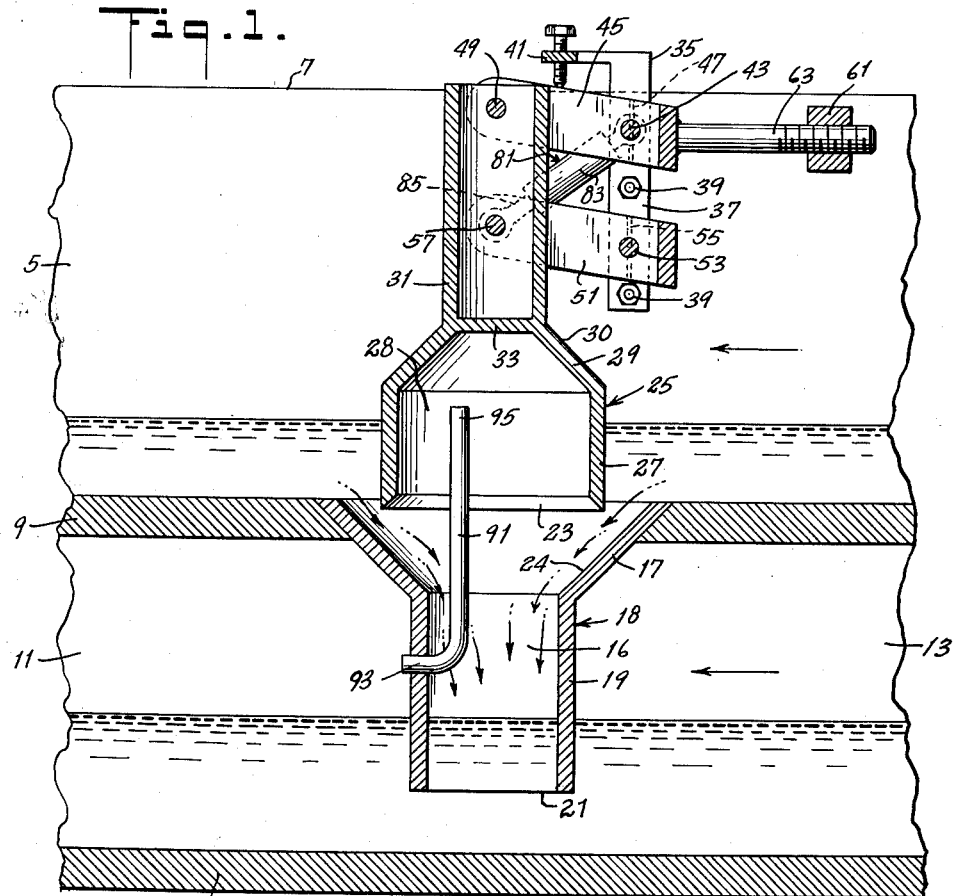
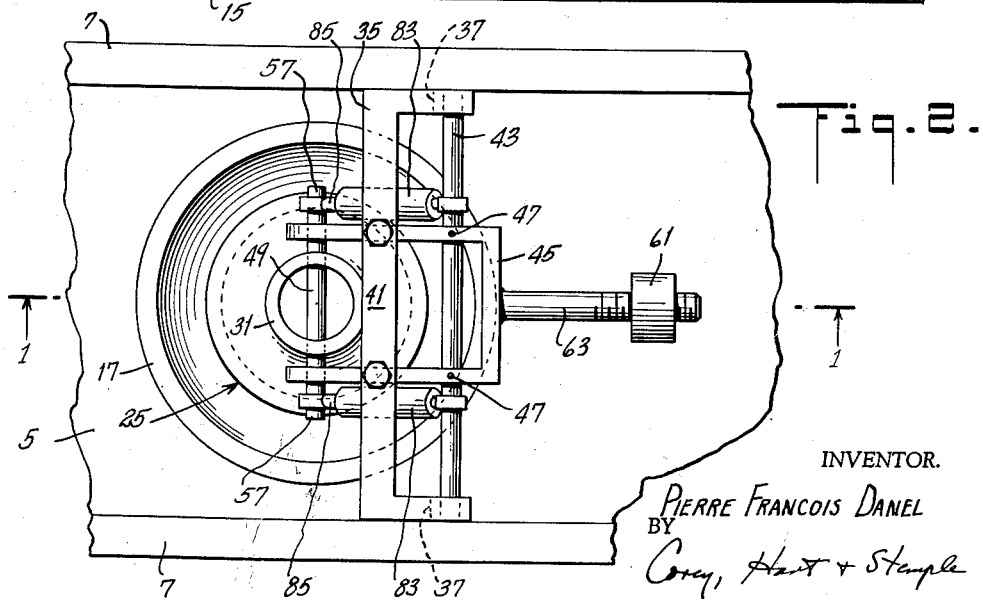
INVENTOR.
PIERRE FRANCOIS DANEL
BY
Corey, Hart & Stemple INVENTOR.
PIERRE FRANCOIS DANEL
BY
Covey, Hart & Stemple United States Patent Office 3,080,879
Patented Mar. 12, 1963

3,080,879
HYDRAULIC FLOW CONTROL APPARATUS
Pierre Francois Danel, La Tronche, France, assignor to Societe Grenobloise d'Etudes et d'Applications Hydrauliques, Grenoble, France, a corporation of France
Filed Jan. 19, 1959, Ser. No. 787,450
Claims priority, application France Jan. 21, 1958
14 Claims. (Cl. 137—101.25)

This invention relates to control of hydraulic fluid and more especially to control of hydraulic fluid flowing in a flow chamber. The invention particularly relates to apparatus for controlling the flow of fluid in a flow chamber in response to variations in the height of the hydraulic fluid in the chamber.

In hydraulic installations the problem arises of controlling the flow of hydraulic fluid, ordinarily the flow of water or sewage or other hydraulic fluid horizontally through a flow channel, in a flow chamber in which the control apparatus is disposed. In some installations, such as sewer systems, it becomes necessary at times to divert some of the flowing fluid from one channel to another or from one flow chamber to another, or on the other hand, to reduce such diversion, in order that the amount of fluid flowing through the respective channels or chambers and the height of the fluid therein shall be under proper control.

It is an object of the invention to provide apparatus for controlling the flow of hydraulic fluid through an opening in response to variations in the level of the hydraulic fluid in a chamber.

It is another object of the invention to provide apparatus for controlling the flow of hydraulic fluid from a chamber in response to variation in the height of the hydraulic fluid in the chamber.

It is an additional object of the invention to provide apparatus for controlling the diversion of hydraulic fluid from a flow channel or flow chamber.

It is a further object of the invention to provide apparatus for controlling the diversion of fluid from one flow chamber to a second flow chamber in response to variation of the height of the fluid in this second flow chamber.

It is a still further object of the invention to provide for control of flow of fluid through an outlet opening of a flow chamber in response to variation in the height of the hydraulic fluid in the chamber above a predetermined height thereof in the chamber.

It is a feature of the invention that a fluid control device, such as a valve element, is associated with means defining an opening providing for discharge therethrough of the hydraulic fluid from a chamber, this valve element being supported for movement thereof to and from a position engaging means defining a seat extending about the opening, in which position the valve element closes the opening and cuts off the outflow of hydraulic fluid through the opening from the chamber. When the valve element is moved to a position away from the seat, under the hydraulic head due to the height of the water in the chamber the fluid may flow through the opening, tending thereby to reduce the height of the fluid in the chamber. As will be understood from further description in connection with the drawings, the variation in the height of the fluid in the chamber initially may not effect movement of the valve with respect to its seat. The valve device, however, is so constructed that movement of the valve element toward or away from its seat is effected when the height of the hydraulic fluid in the chamber exceeds or is less than a predetermined height.

It is a feature of the invention also that the fluid flowing in a given flow chamber may be controlled by the control device for diversion of a portion thereof through an opening leading from the given flow chamber to a second flow chamber, the control of the flow of the fluid diverted through said opening being effected in response to variation in the height of the fluid in one or the other of the chambers. When the fluid rises above a predetermined height, the control apparatus is operated to reduce or to increase the amount of fluid diverted through the opening in order to limit the rise of the hydraulic fluid in a selected chamber.

With these and other objects and features in view, the nature of which will be more apparent, the invention will be more fully understood by reference to the drawings, the accompanying detailed description and the appended claims.

In the drawings:

FIG. 1 is a vertical section on line 1—1 of FIG. 2 through two superposed flow chambers and embodying the apparatus of the invention;

FIG. 2 is a plan view of the apparatus of FIG. 1; and

Figure 3:
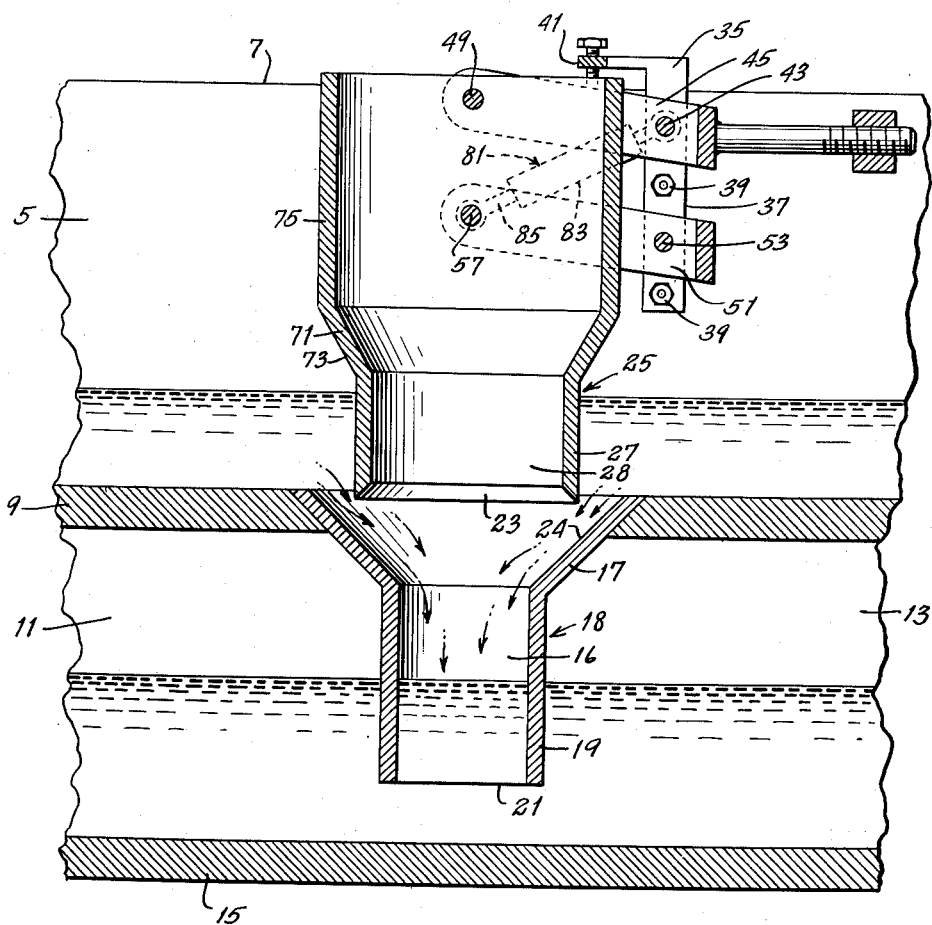
FIG. 3 is a vertical section similar to FIG. 1 showing a modification of the valve structure.

In FIGS. 1 and 2 the flow chamber 5 is defined by vertical walls 7 spaced transversely of the direction of flow, generally horizontal, through the flow chamber 5 and defined also by a bottom wall 9 separating the flow chamber 5 from a lower flow chamber 11 disposed directly beneath the chamber 5 in this embodiment. The flow chamber 11 is defined by its vertical walls 13 and the bottom wall 15 and provides for flow of hydraulic fluid therethrough generally horizontally.

An opening is formed in the horizontal wall 9 separating the two chambers and receives a frusto-conical portion 17 of a member 18 having a vertical sleeve portion 19, the member 18 and its walls 17 and 19 defining an opening or flow passage 16 communicating with the two chambers 5 and 11. The vertical extent of the sleeve portion 19, which may be cylindrical in the embodiment being described, is such as to dispose the lower end 21 of the portion 19 below the level of the hydraulic fluid flowing in the chamber 11 after this level reaches a given height above the base wall 15, so that further rise of the fluid in the chamber 11 will cut off direct communication between the passage 16 within the member 18 and the space above the hydraulic fluid in the chamber 11, for purposes hereinafter described.

The fluid control device of the invention, in the embodiment of FIG. 1, comprises a valve element 23 formed at the bottom end of a hollow member 25 defined by cylindrical wall 27 and by frusto-conical wall 29 extending about a space 28 within the member 25. The wall 29 extends upwardly from the wall 27 and inwardly toward the axis of the valve element, the upper portion of wall 29 connecting to an upper cylindrical part 31 which serves in the present embodiment for supporting the valve element 23 and the member 25 for vertical movement thereof to and from the position of engagement of the valve element 23 with the seating surface 24 provided at the inner surface of the frusto-conical portion 17 of the member 18. For purposes hereinafter described, the hollow space of the member 25 may be closed by the horizontal web 33 extending across the upper end of the conical portion 29 and separating this space from the space within the cylindrical part 31.

For supporting the member 25 and the valve element 23 in proper relation to the valve seat 24, upon the walls 5 a bracket 35 is secured with the vertical legs 37 thereof attached by bolts 39 to the inner faces of the walls 7, the bracket 35 having a horizontal portion 41 extending across the flow chamber between the supporting vertical legs 37.

Extending also across the flow chamber 5 is a shaft 43 bearing in the vertical legs 37 and carrying thereon a lever provided by frame 45 of clevis form which is pinned by pins 47 upon the shaft 43. At the two lefthand ends of the arms of the clevis 45 a shaft 49 is carried which extends through these arms and through the vertical extending wall of the cylindrical part 31 of the member 25, so that as the clevis 45 pivotally moves on the axis of the shaft 43 in the bearings of the legs 37, the shaft 49 and the cylindrical part 31 will be moved upwardly and downwardly to move the member 25 and the valve element 23 away from and toward the seat 24.

In order to maintain this movement of the member 25 approximately in a vertical line, a second lever provided by frame 51 of clevis form is secured to shaft 53 by pins 55, the left-hand ends of the arms of the clevis frame 51 engaging the shaft 57 which, similarly to the shaft 49, extends through these arms and through the wall of the cylindrical part 31. The shaft 53 is supported in bearings formed in the lower part of the two vertical legs 37 of the bracket 35.

It will be understood that by the mechanism described the part 31 will be moved in the vertical direction with only slight movement transversely of the vertical determined by the arcuate movement of the two shafts 49 and 57 about the respective axes of shafts 43 and 53. The proportion and disposition of the parts may be such that the valve element 23 provided at the lower end of the member 25 will be moved into position with the edge of the valve element concentric with and engaging a corresponding part of the inner conical surface 24 on the frusto-conical portion 17 when seating position is reached. To limit the amount of horizontal movement due to the arcuate movement of the shafts 49, 57, the length of the arms respectively between the shafts 49, 57 and the pivotal shafts 43, 53 may be increased to the desired extent.

The weight of the member 25 and the several parts 27, 29, 31 movable therewith and of the clevis frames and other parts at the left side of the pivotal shafts 43, 53 may be counterbalanced by a counterweight 61 threaded on an arm 63 extending to the right of the pivotal shafts 43, 53. The counterweight 61 may be moved toward the left or right by turning it on the thread of the arm 63 until a balancing position is reached. This preferably is accomplished when the cylindrical portion 27 is immersed but the level of the hydraulic fluid in the chamber 5 is not above the upper end of portion 27, the valve element 23 being in a position somewhat open and disposed upwardly with respect to the seat 24.

If the level of the hydraulic fluid in the chamber 5 is assumed to be, as shown in FIG. 1, at a height not above the upper end of the exterior vertically extending peripheral surface of the cylindrical portion 27 of the member 25, the member 25 being lifted to the open position as shown and the mechanism being in balanced condition as above described, the hydraulic fluid may rise to and somewhat above the level shown in FIG. 1 without introducing any force which will effect movement of the member 25 away from or toward the seat 24. When, however, the level of the fluid in the chamber 5 rises above the upper end of the exterior surface of portion 27 and continues upwardly over the exterior conical surface 30 of the portion 29, a change in the forces acting on the mechanism occurs because of the component of the pressure of the hydraulic fluid acting downwardly on the conical surface 30. Movement, therefore, of the member 25 will be effected downwardly to move the valve element 23 toward the seating surface 24. If the level of the fluid in the chamber 5 continues to rise, the valve element 23 may engage the seating surface 24 to close the annular opening between the valve element 23 and the seating surface 24 on the member 18. Thus, flooding or undue rise of the level of the fluid in the hydraulic chamber 11 will be prevented, while providing for diverting a decreased quantity of flow of fluid to the chamber 11 from chamber 5.

Under ordinary conditions the mechanism as described will control the flow of hydraulic fluid through the opening 16 defined by the member 18 with the valve element unseated from the seat 24, small variations in the level in the chamber 5 being ineffective to move the member 25. Larger variations, however, which cause the fluid to rise upon the conical surface 30 will be effective to start the member 25 downwardly toward the closing position of the valve element 23, thereby to reduce the flow through the opening 16. Reduction of the level in chamber 5 correspondingly will effect upward movement of the member 25 to move the valve 23 away from the seat when the level of the fluid has fallen below the conical surface 30.

In the embodiment of FIG. 3, like reference numerals are used for the parts which are the same as those of FIG. 1. In the embodiment of FIG. 3 the member 25 is provided with its cylindrical lower portion 27 extending about the space 28 and at its lower end with valve element 23 for engagement with the seating surface 24 in the same manner as in FIG. 1. In FIG. 3, however, the member 25 is provided with an outwardly flaring wall 71 providing an exterior frusto-conical surface 73 extending upwardly from the portion 27 to and connected to an upper part 75 of cylindrical form corresponding to the upper part 31 of FIG. 1 but of larger diameter. The shafts 49, 57 carried by the clevis frames 45, 51 pass through the cylindrical wall of the part 75 in a similar manner to the shafts 49, 57 in FIG. 1. The clevis frames 45 and 51 in FIG. 3 are supported on shafts 43, 53 and function in the same manner as do these clevis frames in FIG. 1. It will be understood that upon vertical movement of the member 25 concomitantly with pivotal movement of frames 45 and 51, the valve element 23 in FIG. 3 may be moved toward or away from the seating surface 24 in the same manner as described in connection with FIG. 1.

In the embodiment of FIG. 3, because of the outwardly flaring conical surface 73, when the level of the hydraulic fluid in the chamber 5 rises above the upper end of the vertical cylindrical surface provided by the portion 27 and comes into engagement with the conical surface 73, a vertical component of the hydraulic pressure acting on the conical surface 73 will exert an upward force on the member 25 effecting movement of the member 25 and of the valve element 23 upwardly away from the seat 24. When, therefore, the level of the fluid rises in the chamber 5 in the embodiment of FIG. 3 because, for example, an excess of fluid is flowing into the chamber 5, this excess may be diverted through the opening 16 provided by the member 18, by the opening movement of the valve element 23. The greater the rise in the chamber 5 along the conical surface 73 the greater the opening effected by the movement of the member 25 and the valve element 23 away from the seat 24 because of the greater area of the conical surface 73 upon which the upward force is exerted by the hydraulic fluid, until the lower end of the cylindrical surface 75 is reached. It will be understood, similarly to the action described in connection with FIG. 1, that variations of the level of the fluid in the chamber 5 are ineffective to move the member 25 in the vertical direction, until the level reaches the conical surface 73, the hydraulic pressure being balanced in all directions on the cylindrical surface of the portion 27. After reaching the surface of the upper cylindrical parts 31 and 75 the force exerted downwardly or upwardly in FIGS. 1 and 3 will not further increase except that force due to greater head of the fluid upon the surface 30, 73.

It will be understood further that the proportions of the structure in FIGS. 1 and 3 and the adjustment of balance may be such that a predetermined amount of normal flow may pass through the opening 16 with the valve element 23 disposed in predetermined spaced relation to the seating surface 24 under conditions in which, although the level of the fluid in the chamber 5 may vary somewhat, this level does not rise above the upper end of the vertical surface of the cylindrical portion 27, that is, it does not rise upon the conical surface 30 or 73. The level in the chamber 5 may fall until it reaches the bottom wall 9 without change in the position of the valve element 23 unless a new setting of the balancing weight 61 is made. The proportions and setting may be such that the valve element 23 may move to and from engagement with the seating surface 24 with a predetermined movement.

The maximum normal level for flow through the opening 16, however, is determined substantially by the position of the lower end of the conical surface 30 or 73 above the surface of the bottom wall 9, the available area between the valve element 23 and the seating surface 24 determining the flow through opening 16. When the level, however, reaches a height in excess of that determined by the lower end of the conical surface 30 or 73, downward or upward movement of the valve element 23 will occur and the flow through the opening 16 will be decreased or increased to prevent an excessive further rise of the hydraulic fluid in the lower chamber 11 or in the chamber 5, as the case may be, the diversion of a portion of the fluid into the lower chamber 11 being changed accordingly, or cut off in the closed position of the valve element 23.

In both embodiments of FIGS. 1 and 3 a damping device 81 is provided which may comprise a cylinder 83 pivotally connected at one end to shaft 43 and having an internal piston (not shown) carried on the rod 85 which is pivotally connected at its outer end to shaft 57. Pivotal movement of the clevis frames upon the axes of shafts 43, 53 thus is cushioned in either direction of the movement of the member 25 with respect to the seating surface 24.

In the embodiment of FIG. 1 is shown a pipe 91 which is disposed within the space of the opening 16 and within the space defined by the conical surface 24. The lower end 93 of the pipe 91 is secured in the wall of the sleeve 19 and communicates with the space of the chamber 11 above the level of the fluid therein under the conditions illustrated in FIG. 1. The upper end of the pipe 91 is disposed at a point adjacent the upper part of the space 28 within the member 25, this space being closed at its upper end by transverse wall 33. The position of the upper end 95 of pipe 91 is such as to allow for downward movement of the member 25 without engagement of the wall 29 or 33 with the upper end 95 of the pipe 91. It is not necessary to utilize the pipe 91 in all cases but, when it is provided in the embodiment of FIG. 1, the level of the fluid in the chamber 11 may rise to any position below the end 93 of the pipe 91 without substantially affecting the operation of the mechanism comprising the valve element and the member 25 as described for control of flow of the fluid from the chamber 5 to the chamber 11 through the opening 16. Rise of the fluid in the chamber 11, however, above the open end 93 of the pipe 91 closes this end and cuts off communication between the space above the fluid in the chamber 11 and the hollow space 28 within the member 25. Under these conditions it will be understood, since the valve element 23 and the cylindrical lower portion 27 of the member 25 are submerged in the fluid in the upper chamber 5, that a certain amount of suction will be created upon the member 25 because of the removal of gas or air from within the space 28 due to the ejector action of the hydraulic fluid flowing downwardly through the space within the conical portion 17 and down through the opening 16 into the chamber 11. The suction force thus created on the member 25 effects a downward movement of the member 25 to move the valve element 23 downwardly toward the seat 24, thus reducing the area for flow of the hydraulic fluid downwardly from the chamber 5 to the lower chamber 11. This action reduces the flow of fluid into the chamber 11 and tends to stop the rise of the fluid in the chamber 11 or to cause reduction of the level therein and uncovering of the lower end 93 of the pipe 91 to restore the normal action.

Other modifications may be utilized than those shown in the drawings which provide for engagement by the hydraulic fluid as it rises or falls in the respective chambers with a surface on the movable member 25 which develops a force acting in the direction to move the member 25 and its valve element 23 toward or away from the seating surface, so as to control the flow of the hydraulic fluid through the opening. Such a surface on the member 25, instead of being conical or frusto-conical, may be of other contour which, however, is such as to provide the component of the hydraulic pressure acting in the direction to move the member 25 so as to move the valve element toward or away from its seating position. Within the scope of the invention also the extent, vertical in the embodiments disclosed, of the portion 27 of the member 25, on the one hand, may be very short, or on the other hand, may be of considerable length depending upon the amount of variation of level which it is desired to provide for before initiating opening or closing movement of the valve. Moreover, the extent of the conical portion 29, 71 of the member 25 in the embodiments disclosed which develops the component of the hydraulic pressure acting to effect movement of the valve element may be of greater or less length depending upon the area needed to develop the force required to effect movement of the valve device and upon the degree of regulation desired in the control movement of the member 25 and its valve element 23 with respect to the seating surface. Such variations are intended to be within the scope of the invention as covered by the appended claims.

I claim:

1. In a hydraulic installation having a chamber for directing the flow of hydraulic fluid, the combination of means defining an outlet opening from said chamber located so that the hydraulic fluid flows thereover, a valve element having a form for engaging said means to close said opening and movable to and from the position of closing said opening, a member disposed so as to become immersed in the hydraulic fluid flowing over said outlet opening in said chamber, means supporting said member in said chamber for movement of said member generally in the upward and downward direction, said valve element being connected to said member and movable toward and away from closing position concomitantly with said movement of said member, said member being located above said valve element and said supporting means tending to maintain said member in an adjusted position with said valve element therebelow in a given position relative to said opening, said member providing a hollow space therewithin, means defining a second chamber exterior to said first chamber, means connected to said means defining said opening and providing a passage through said opening providing for hydraulic flow between said chambers, a gas confining tube extending into and communicating at one end with said hollow space of said member in all positions of said member in said upward and downward movement thereof, said tube at its other end extending into and communicating with the space within said second chamber above a predetermined height of the hydraulic fluid therein so that when said other end of said tube is closed by the hydraulic fluid at a higher level in said second chamber than said predetermined height a change of the gass pressure in said hollow space of said member will be developed by the hydraulic flow through said passage to effect movement of said member to produce movement of said valve element with respect to said means defining said opening.

2. In a hydraulic installation having a chamber for directing the flow of hydraulic fluid, the combination of means defining an outlet opening from said chamber and located so that the hydraulic fluid flows thereover, a valve element having a form for engaging said outlet means to close said opening and movable to and from the position of closing said opening, a first member disposed so as to become immersed in the hydraulic fluid flowing over said outlet opening in said chamber, means supporting said member in said chamber for movement of said member generally in the upward and downward direction, said valve element being connected to said member and movable toward and away from closing position concomitantly with said movement of said member, said member being located above said valve element and said supporting means tending to maintain said member in an adjusted position with said valve element therebelow in a given position relative to said opening, said member providing an exterior peripheral surface having a dimension extending generally in the upward and downward direction such that upon variation of the height of the fluid in said chamber between the upper and lower limits of such dimension the hydraulic pressure on said surface substantially is ineffective to move said member upwardly or downwardly from said adjusted position and thereby to change said given position of said valve element relative to said outlet opening, an auxiliary member disposed adjacent said first member along said upward and downward direction and connected to said first member to move therewith upwardly and downwardly, said two members being disposed so that one of said members becomes immersed after the other upon said variation of the height of the fluid in said chamber, said auxiliary member providing an exterior surface having adjacent said first surface a peripheral extent along said periphery of said first surface and extending upwardly from and inwardly with respect to said peripheral extent thereof so that said hydraulic pressure on said auxiliary surface when immersed is effective to operate said operating means to move said first member along said direction from said adjusted position to produce movement of said valve element from said given position thereof relative to said means defining said opening.

3. In a hydraulic installation having a flow chamber for directing the flow of hydraulic fluid, the combination of means defining an outlet opening from said chamber and located so that the hydraulic fluid flows thereover, a valve element having a form for engaging said outlet means to close said opening and movable to and from the position of closing said opening, a first member disposed so as to become immersed in the hydraulic fluid flowing over said outlet opening in said flow chamber, means supporting said member in said chamber for movement thereof generally in the upward and downward direction, said valve element being connected to said member and movable toward and away from closing position concomitantly with said movement of said member, said member being located above said valve element and said supporting means tending to maintain said member in an adjusted position with said valve element therebelow in a given position relative to said opening, said member providing a vertical exterior surface extending peripherally about a vertical so that upon variation of the height of the fluid in said chamber between the upper and lower limits of such vertical surface the hydraulic pressure on said vertical surface substantially is ineffective to move said member upwardly or downwardly from said adjusted position and thereby to change said given position of said valve element relative to said outlet opening, an auxiliary member disposed adjacent said first member along said vertical and connected to said first member to move upwardly and downwardly therewith and so that one of said members becomes immersed after the other upon said variation of the height of the fluid in said chamber, said auxiliary member having an exterior surface extending about and in inclined relation to said vertical so that the hydraulic pressure on said auxiliary surface when immersed is effective to operate said supporting means to move said first member vertically from said adjusted position to produce movement of said valve element from said given position thereof with respect to said means defining said opening, means defining a second flow chamber communicating with said first mentioned flow chamber through said opening, said first member having walls defining said vertical exterior surface thereof and defining a hollow gas confining space within said member, and a gas confining tube extending into and communicating at one end with said hollow space in all positions of said member in said upward and downward movement thereof, said tube at its other end extending into and communicating with the space within said second flow chamber above a predetermined height of the hydraulic fluid therein so that when said other end of said tube is closed by the hydraulic fluid at a higher level in said second flow chamber than said predetermined height a change of the gas pressure is developed in said hollow space to effect vertical movement of said member to produce said movement of said valve element with respect to said means defining said opening.

4. In a hydraulic installation having a flow chamber for directing the flow of hydraulic fluid, the combination of means defining a horizontally disposed valve seat extending generally about an opening from said chamber located so that the hydraulic fluid flows thereover, a valve element providing a valve seat engaging part extending generally horizontally and about said opening and having a form for engaging said valve seat in the closed position of said valve element, means supporting said valve element for movement thereof generally vertically to said valve seat and downwardly and upwardly to and from said seating position and tending to maintain said seat engaging part of said valve element in a given position relative to said seat, a member having a lower portion carrying at its bottom end said seat engaging part of said valve element and having an upper portion extending upwardly from and connected to said lower portion at the upper end of said lower portion, said lower portion providing a vertical exterior surface extending upwardly from said part and about said opening, said upper portion providing an exterior surface extending upwardly from the upper end of and in inclined relation to said vertical exterior surface of said lower portion, said upwardly extending exterior surface of said upper portion being inclined inwardly with respect to said opening so that the pressure on said member when said lower portion and at least a part of said upper portion are immersed in the hydraulic fluid is effective to move said member and said valve element in a given direction along the vertical to move said seat engaging part of said valve element from said given position thereof with respect to said seat.

5. In a hydraulic installation the combination as defined in claim 3 in which said auxiliary member has walls formed so that said inclined exterior surface thereof extends upwardly and inwardly toward said vertical and defines the upper portion of said gas confining space.

6. In a hydraulic installation the combination as defined in claim 3 in which said first flow chamber is disposed above said second flow chamber and said means defining said opening provides communication between said chambers, said gas confining tube extending through said opening means into said hollow space and extending into said space within said second flow chamber through a wall provided by said means defining said opening.

7. In a hydraulic installation comprising two separate conduits located at different levels and in each of which a stream of liquid normally flows at a height less than the height of the conduit so that there is a gas space above the level of such liquid stream, the combination of means defining an outlet opening in the upper conduit below the normal flow level of the liquid therein so that such liquid may discharge through such opening and into the lower conduit, a valve element having a form for engaging said outlet means to close said opening and movable to and from the position of closing said opening, a member disposed so that its lower end is immersed in the liquid flowing over said outlet opening, means in said upper conduit supporting said member therein for movement thereof generally in the upward and downward direction, said valve element being located below and connected to said member so as to be movable toward and away from closing position concomitantly with said movement of said member, said member having an exterior surface disposed substantially vertically so that upon variation of the height of the liquid in said upper conduit between the upper and lower limits of such surface the hydraulic pressure on said surface substantially is effective to move said member upwardly or downwardly from an adjusted position and thereby to change the position of said valve element relative to said outlet opening, said vertical exterior surface having a height substantially greater than the normal height of liquid level in said upper conduit so that the upper limit of said vertical surface thereof is normally above the normal flow level of the liquid in said upper conduit, and said supporting means tending to maintain said member in an adjusted position with said valve element therebelow in a given position relative to said opening throughout a range of variation of the flow level of the liquid in said upper conduit defined by the upper and lower limits of such surface, means connecting the interior of said movable member with the atmosphere and said member being provided with an open end at the lower end of said member so that such interior is in communication with said outlet opening.

8. In a hydraulic installation such as defined in claim 7, in which said atmosphere connecting means provides a gas passageway extending from the interior of said movable member to the gas space above the normal level of the stream in said lower liquid conduit, and is constructed and arranged to maintain such communication during the movements of said member without interfering with the same.

9. In a hydraulic installation such as defined in claim 7, in which said atmosphere connecting means provides a gas passageway extending from the interior of said movable member to the gas space above the normal level of the stream in said upper liquid conduit, and is constructed and arranged to maintain such communication during the movements of said member without interfering with the same.

10. In a hydraulic installation such as defined in claim 7, in which said movable member is constructed so that the interior thereof is closed at its upper end and said atmosphere connecting means is in communication with such interior between said closed upper end of such interior and said open bottom end of said movable member.

11. In a hydraulic installation such as defined in claim 7 including means in said upper conduit normally disengaged from the stream of liquid therein and operable by the pressure of the liquid in such stream upon an increase in the height of liquid level above such upper limit to operate said supporting means to move said movable member from its said adjusted position to produce movement of said valve element from said given position thereof with respect to said means defining said opening.

12. In a hydraulic installation such as defined in claim 11 in which said operable means includes an auxiliary member disposed adjacent to the upper end of said movable member and connected to said movable member to move upwardly and downwardly therewith and so that said auxiliary member becomes immersed after said movable member upon increase in the height of liquid level in said upper conduit, said auxiliary member having an exterior surface of such inclination that hydraulic pressure thereon, when such surface is immersed, is effective to produce said valve element movement.

13. In a hydraulic installation such as defined in claim 12, in which the exterior surface of said auxiliary member inclines upwardly and inwardly with respect to the substantially vertically disposed exterior surface on said movable member so that such hydraulic pressure is effective to move said movable member in the downward direction.

14. In a hydraulic installation such as defined in claim 12, in which the exterior surface of said auxiliary member inclines upwardly and outwardly with respect to the substantially vertically disposed exterior surface on said movable member so that such hydraulic pressure is effective to move said movable member in the upward direction.

References Cited in the file of this patent

UNITED STATES PATENTS

| | | |
|---|---|---|
| 453,523 | Thoens et al. | June 2, 1891 |
| 1,857,409 | Smith | May 10, 1932 |
| 2,427,359 | Kuenhold | Sept. 16, 1947 |
| 2,540,361 | Whitley | Feb. 6, 1951 |

FOREIGN PATENTS

| | | |
|---|---|---|
| 1,302 | Great Britain | May 26, 1860 |

UNITED STATES PATENT OFFICE
CERTIFICATE OF CORRECTION

Patent No. 3,080,879                March 12, 1963

Pierre Francois Danel

It is hereby certified that error appears in the above numbered patent requiring correction and that the said Letters Patent should read as corrected below.

Column 6, line 64, for "gass" read -- gas --; column 9, line 13, for "effective" read -- ineffective --.

Signed and sealed this 8th day of October 1963.

(SEAL)
Attest:

ERNEST W. SWIDER
Attesting Officer

EDWIN L. REYNOLDS
Acting Commissioner of Patents